(12) United States Patent
Swaine et al.

(10) Patent No.: US 9,672,159 B2
(45) Date of Patent: Jun. 6, 2017

(54) TRANSLATION BUFFER UNIT MANAGEMENT

(71) Applicant: ARM Limited, Cambridge (GB)

(72) Inventors: Andrew Brookfield Swaine, Cambridge (GB); Viswanath Chakrala, Bangalore (IN)

(73) Assignee: ARM Limited, Cambridge (GB)

( * ) Notice: Subject to any disclaimer, the term of this patent is extended or adjusted under 35 U.S.C. 154(b) by 75 days.

(21) Appl. No.: 14/790,019

(22) Filed: Jul. 2, 2015

(65) Prior Publication Data

US 2017/0004091 A1  Jan. 5, 2017

(51) Int. Cl.
*G06F 12/1027* (2016.01)

(52) U.S. Cl.
CPC .... *G06F 12/1027* (2013.01); *G06F 2212/152* (2013.01); *G06F 2212/68* (2013.01)

(58) Field of Classification Search
CPC ............. G06F 12/1027; G06F 12/1036; G06F 2212/68–2212/684; G06F 12/1441; G06F 12/1443; G06F 21/79
See application file for complete search history.

(56) References Cited

U.S. PATENT DOCUMENTS

| | | | | |
|---|---|---|---|---|
| 4,376,297 A * | 3/1983 | Anderson | ........... | G06F 12/1036 711/207 |
| 5,101,346 A * | 3/1992 | Ohtsuki | ................ | G06F 15/167 712/28 |
| 5,455,922 A * | 10/1995 | Eberhard | ............ | G06F 12/1036 711/154 |
| 5,878,245 A * | 3/1999 | Johnson | .............. | G06F 9/30043 711/131 |
| 6,044,447 A * | 3/2000 | Averill | .................... | G06F 12/10 711/118 |
| 6,212,613 B1 * | 4/2001 | Belair | ................. | G06F 12/1027 711/207 |
| 6,598,050 B1 * | 7/2003 | Bourekas | ............ | G06F 12/1036 |
| 6,604,187 B1 * | 8/2003 | McGrath | ............. | G06F 12/1036 711/209 |
| 7,296,139 B1 * | 11/2007 | Case | ................... | G06F 12/0897 710/26 |

(Continued)

*Primary Examiner* — Jared Rutz
*Assistant Examiner* — Khoa D Doan
(74) *Attorney, Agent, or Firm* — Nixon & Vanderhye P.C.

(57) ABSTRACT

A data processing system 2 incorporates a translation buffer unit 24, 26, 28 and a translation control unit 30. The translation buffer unit responds to receipt of a memory access transaction for which translation data is unavailable in that translation buffer unit by issuing a request to the translation control unit to provide translation data for the memory access transaction. The translation control unit is responsive to disabling or enabling of address translation for a given type of memory access transaction to an issue invalidate command to all translation buffer units which may be holding translation data for that given type of memory access transaction. When the translation control unit receives a request for translation from the translation buffer unit for a memory access of the given type for which memory address translation is disabled, then the translation control unit responds to returning global translation data to be used by the translation buffer for all memory access translations of that given type.

17 Claims, 5 Drawing Sheets

(56) References Cited

U.S. PATENT DOCUMENTS

| | | | | |
|---|---|---|---|---|
| 7,712,098 B2* | 5/2010 | Chauvel | G06F 9/5016 | 711/154 |
| 8,533,425 B1* | 9/2013 | Yuan | G06F 13/1642 | 711/133 |
| 2002/0069328 A1* | 6/2002 | Chauvel | G06F 1/3203 | 711/130 |
| 2004/0025161 A1* | 2/2004 | Chauvel | G06F 9/30174 | 718/102 |
| 2004/0073734 A1* | 4/2004 | Arimilli | G06F 9/30054 | 710/200 |
| 2004/0073909 A1* | 4/2004 | Arimilli | G06F 9/52 | 718/105 |
| 2004/0078536 A1* | 4/2004 | Chen | G06F 12/1466 | 711/164 |
| 2004/0143720 A1* | 7/2004 | Mansell | G06F 12/1491 | 711/206 |
| 2004/0148480 A1* | 7/2004 | Watt | G06F 9/4812 | 711/163 |
| 2005/0005074 A1* | 1/2005 | Landin | G06F 12/0815 | 711/148 |
| 2005/0080934 A1* | 4/2005 | Cota-Robles | G06F 12/1036 | 710/1 |
| 2005/0160210 A1* | 7/2005 | Watt | G06F 9/4812 | 710/269 |
| 2006/0123184 A1* | 6/2006 | Mondal | G06F 9/3016 | 711/6 |
| 2007/0005932 A1* | 1/2007 | Covelli | G06F 12/1027 | 711/207 |
| 2007/0226450 A1* | 9/2007 | Engbersen | G06F 12/1483 | 711/203 |
| 2008/0134174 A1* | 6/2008 | Sheu | G06F 12/1036 | 718/1 |
| 2008/0163203 A1* | 7/2008 | Anand | G06F 9/45533 | 718/1 |
| 2009/0320048 A1* | 12/2009 | Watt | G06F 9/4812 | 719/319 |
| 2010/0100702 A1* | 4/2010 | Doi | G06F 12/1036 | 711/207 |
| 2013/0159664 A1* | 6/2013 | Blinzer | G06F 9/3004 | 711/207 |
| 2013/0179642 A1* | 7/2013 | Plondke | G06F 12/0811 | 711/142 |
| 2014/0258663 A1* | 9/2014 | Zeng | G06F 21/79 | 711/163 |
| 2014/0351554 A1* | 11/2014 | Falik | G06F 12/1009 | 711/207 |
| 2015/0199279 A1* | 7/2015 | Haugan | G06F 12/1009 | 711/133 |
| 2015/0378731 A1* | 12/2015 | Lai | G06F 9/30174 | 712/30 |
| 2016/0041922 A1* | 2/2016 | Parks | G06F 12/1036 | 711/207 |
| 2016/0170904 A1* | 6/2016 | Guo | G06F 12/0842 | 711/207 |

* cited by examiner

TRANSLATION BUFFER UNIT MANAGEMENT

BACKGROUND

This disclosure relates to the field of data processing systems. More particularly, this disclosure relates to data processing systems including a translation buffer unit storing translation data to translate an input address of a memory address transaction to an output address and a translation control unit to provide translation data to the translation buffer unit.

It is known to provide data processing systems incorporating one or more translation buffer units that are supplied with translation data by a translation control unit. Such an arrangement may be used, for example, in the context of a system memory management unit of an integrated circuit including a plurality of transaction sources each generating virtual addresses which are then translated into physical addresses to access a shared memory.

SUMMARY

Viewed from one aspect the present disclosure provides apparatus for processing data comprising:
a translation buffer unit to store translation data to translate an input address of a memory access transaction to an output address; and
a translation control unit to provide said translation data to said translation buffer unit, wherein
said translation buffer unit is responsive to receipt of a memory access transaction for which translation data is unavailable in said translation buffer unit to issue a request to said translation control unit to provide translation data for said memory access transaction;
said translation control unit is responsive to a change in enablement of address translation for a given type of memory access transaction to issue an invalidate command to said translation buffer unit to invalidate any translation data for said given type of memory access transaction stored in said translation buffer unit; and
said translation control unit is responsive to receipt of a request for translation data from said translation buffer unit for a memory access of said given type for which memory address translation is disabled to return global translation data to be used by said translation buffer unit for all memory access transactions of said given type.

Viewed from another aspect the present disclosure provides apparatus for processing data comprising:
translation buffer means for storing translation data to translate an input address of a memory access transaction to an output address; and
translation control means for providing said translation data to said translation buffer unit, wherein
said translation buffer means is responsive to receipt of a memory access transaction for which translation data is unavailable in said translation buffer means to issue a request to said translation control means to provide translation data for said memory access transaction;
said translation control means is responsive to a change in enablement of address translation for a given type of memory access transaction to issue an invalidate command to said translation buffer means to invalidate any translation data for said given type of memory access transaction stored in said translation buffer means; and
said translation control means is responsive to receipt of a request for translation data from said translation buffer means for a memory access of said given type for which memory address translation is disabled to return global translation data to be used by said translation buffer means for all memory access transactions of said given type.

Viewed from a further aspect the present disclosure provides a method of processing data comprising:
storing in a translation buffer unit translation data to translate an input address of a memory access transaction to an output address; and
providing said translation data to said translation buffer unit with a translation control unit, wherein
in response to receipt of a memory access transaction for which translation data is unavailable in said translation buffer unit, said translation buffer unit issue a request to said translation control unit to provide translation data for said memory access transaction;
in response to a change in enablement of address translation for a given type of memory access transaction, said translation control unit issues an invalidate command to said translation buffer unit to invalidate any translation data for said given type of memory access transaction stored in said translation buffer unit; and
in response to receipt of a request for translation data from said translation buffer unit for a memory access of said given type for which memory address translation is disabled, said translation control unit returns global translation data to be used by said translation buffer unit for all memory access transactions of said given type.

The above, and other objects, features and advantages of this disclosure will be apparent from the following detailed description of illustrative embodiments which is to be read in connection with the accompanying drawings.

DESCRIPTION OF EXAMPLE EMBODIMENTS

Figure 1:
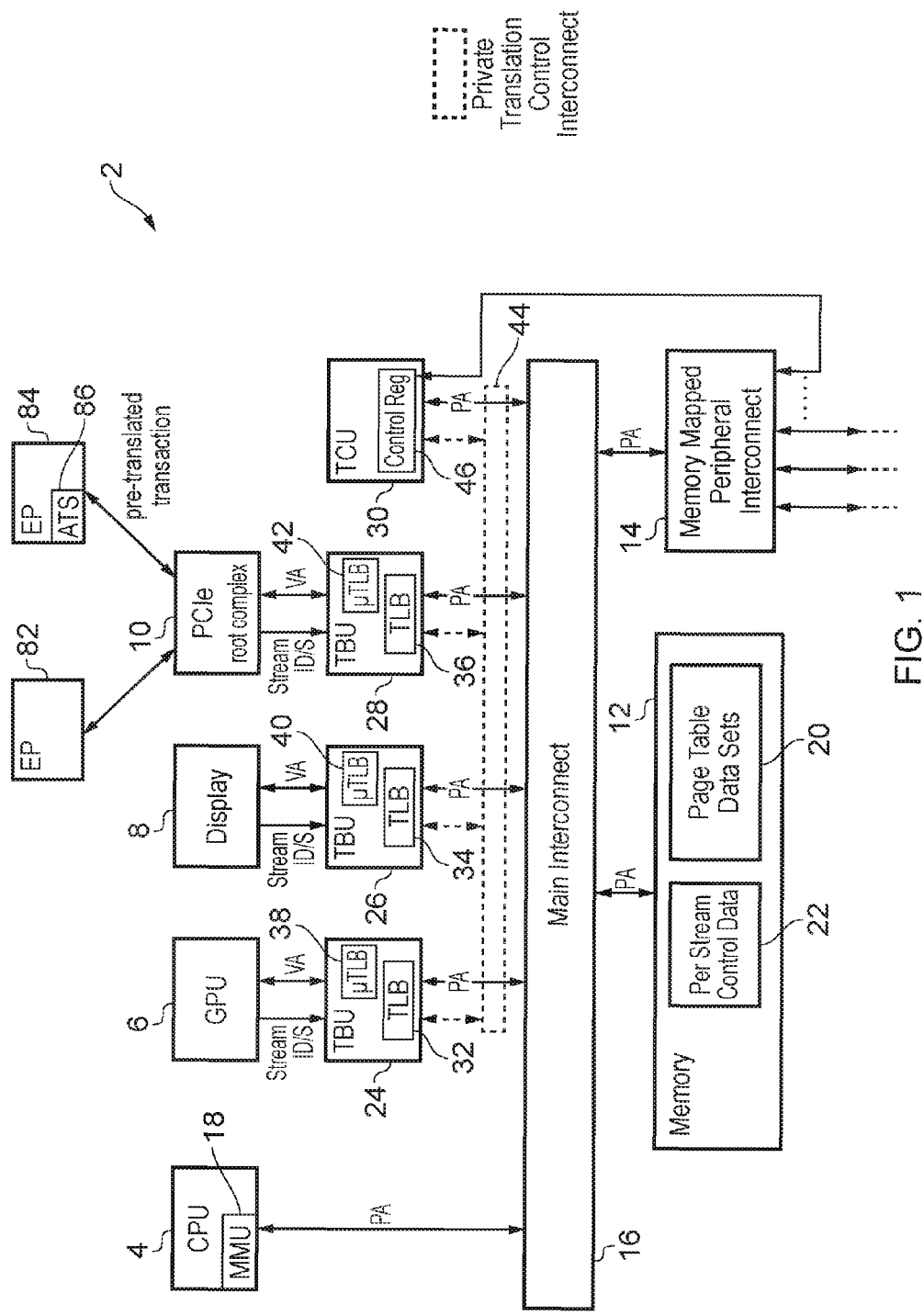
FIG. 1 schematically illustrates a data processing system including a plurality of translation buffer units and a control unit.

FIG. 1 schematically illustrates a data processing system 2 including a general purpose processor 4, a graphics processing unit 6, a display 8, a PCIexpress root complex 10, a shared memory 12 and a memory mapped peripheral interconnect 14 all communicating via a main interconnect 16. The general purpose processor 4 includes a memory management unit 18 which serves to translate between virtual addresses and physical addresses using translation data read from page table data sets 20 stored within the shared memory 12. Multiple sets of page table data may be provided with different page table data sets being used to provide translation data for different types of operation. For example, memory access translations may be generated in either a secure mode (domain) of processing or a non-secure mode of processing as indicated by an S-bit signal which accompanies the virtual address as this is generated. One set of page table may be used in the secure mode and a different set of page tables may be used in the non-secure mode. In a similar way, different streams of memory access transactions may be identified by respective stream identifiers (StreamIDs) which accompany the virtual addresses. Different streams may have different control data associated with them, such as control data specifying different access parameters associated with different streams. Thus, a given memory access transaction may have one of a variety of different memory access transaction types. For example, a memory access transaction may be of a given type corresponding to cacheable memory access transactions or may be of a given type corresponding to non-cacheable memory access transactions. Similarly, a memory access transaction may be one of a plurality of different types of a transaction with each of these different types corresponding to a different stream identifier. Per stream control data 22 stored within the memory 12 may indicate access control parameters to be associated with particular stream identifiers and one of a number of different sets of page table data which are used to provide translation data for a given stream identifier.

While the memory management unit 18 of the general purpose processor 4 provides virtual-to-physical address translation and memory access control to the general purpose processor 4, the graphics processing unit 6, the display 8 and the PCIexpress root complex 10 do not have such an in-built memory management unit capability and accordingly rely on respective translation buffer units 24, 26 and 28 to perform translations from virtual addresses to physical addresses and to apply any memory access attributes, such as enforcing read only status, privilege level restrictions and the like. Each of the translation buffer units 24, 26, 28 includes a respective translation lookaside buffer 32, 34, 36 as well as a respective micro-translation lookaside buffer 38, 40, 42. The micro translation lookaside buffers 38, 40, 42 store fewer translation data entries (e.g. one global translation data entry) than the main translation lookaside buffers 32, 34, 36 and have a lower energy consumption to access than the main translation lookaside buffers 32, 34, 36. The main translation lookaside buffers 32, 34, 36 may be used to store multiple translation data entries, whereas the micro translation lookaside buffers 38, 40, 42 may be used to store respective global translation data entries.

A translation control unit 30 communicates via a private translation control interconnect 44 with each of the translation buffer units 24, 26, 28. When a translation buffer unit 24, 26, 28 receives a virtual address, it performs a lookup in the main translation lookaside buffer 32, 34, 36 (or microtranslation lookaside buffer 38, 40, 42 if enabled) to determine if appropriate translation data is present. If appropriate translation data is unavailable, then the translation buffer unit 24, 26, 28 issues a request to the translation control unit 30 to provide translation data for the memory access transaction which has "missed". The translation control unit 30 performs a page table walk through the page table data sets 20 stored within the shared memory 12 to read the required translation data (including access control and other parameters). The particular page table within which the page table walk is performed may be selected in dependence upon parameters such as whether the memory access originates from secure processing or non-secure processing, the stream identifier of the memory access translation, a context identifier of the memory access transaction or some other parameter.

In some operational circumstances, it may be desired to disable address translation for given types of memory access transaction. For example, it may be desired to disable translation for all secure memory transactions or all memory access transactions from a given stream identifier. The translation control unit 30 may include a control register 46 including flags which indicate whether address translation is enabled or disabled or a variety of different types of memory access transaction. These flags may be set under software control via a memory mapped peripheral controller 14 which maps the control register 46 to a memory address and accordingly makes the disabled flags software writable. It is also possible that address translation may be disabled and enabled using control data, such as the per stream control data 22 stored within the shared memory 12.

When the translation control unit 30 detects that a flag value has been changed within the control register 46 disabling address translation for a given type of memory transaction, or a lookup within the per stream control data 22 indicates such a change has arisen disabling address translation for a given stream identifier, the translation control unit 30 broadcasts an invalidate command for that given type of memory access to the translation buffer units 24, 26, 28. It will be appreciated that in this example embodiment, multiple translation buffer units 24, 26, 28 are provided, but it is also possible in other embodiments that only a single translation buffer unit 24, 26, 28 would be present. The translation buffer units 24, 26, 28 respond to the invalidate command by invalidating any translation data entries they are holding which are rendered "out-of-date" by the received invalidate command. Accordingly, if translation is enabled for a given type of transaction and then an invalidate command is received in respect of that given type of transaction, then all of the translation data entries for that given type of transaction will be marked as invalid (if any are found). Conversely, should translation be disabled and a global translation data entry be in use within one of the micro translation lookaside buffers 38, 40, 42 and a change occurs indicating that address translation is to be enabled, then the associated global translation data entries within the micro translation lookaside buffers 38, 40, 42 may be invalidated using a broadcast invalidate command for the given type of transaction and thereafter trigger the fetching of valid translation data for the now enabled translation. Thus, the translation data in use for a given type of transaction may be invalidated upon a change of enablement (e.g. enabling or disabling) of translation for the given type of transaction.

When translation for a given type of memory address translation has been disabled and a translation buffer unit 24, 26, 28 receives a first further memory access request of that given type, the translation buffer unit 24, 26, 28 will not contain any appropriate translation data and accordingly a translation data "miss" occurs. This is notified using a request for translation data via the private translation control interconnect 44 to the translation control unit 30. The translation control unit 30 receives the request for translation data and identifies that it is in respect of a type of memory access translation for which address translation is disabled. Accordingly, the translation control unit 30 returns via the private translation control interconnect 44 to the requesting translation buffer unit 24, 26, 28 a global translation data entry which is to be thereafter applied (until invalidated) by the receiving translation buffer unit 24, 26, 28 to the present memory access transaction and further memory access transactions of that given type. When address translation for the given type of memory access is enabled, then a broadcast invalidate command is sent out via the private translation control interconnect 44 to invalidate any such global translation data entries stored within the micro-translation lookaside buffers 38, 40, 42.

The global translation data may specify that an input address is to be used unaltered as an output address, i.e. no address translation is to be performed. Thus, the address generated as a virtual address by one of the graphics processing unit 6, the display 8 or the PCIexpress root complex 10 may be passed on by the respective translation buffer unit 24, 26, 28 to the main interconnect 16 in an unaltered form and used as a physical address which is applied to the shared memory 12. The global translation data may also specify access control attributes to be applied to the memory access transaction which is received. These memory access attributes will be applied globally to all memory access transactions of the given type of memory access transaction which is disabled. The global translation data may be associated with a page of memory specified as sufficiently large to cover all memory addresses that can be generated as input addresses to the respective translation buffer unit 24, 26, 28.

Figure 2:
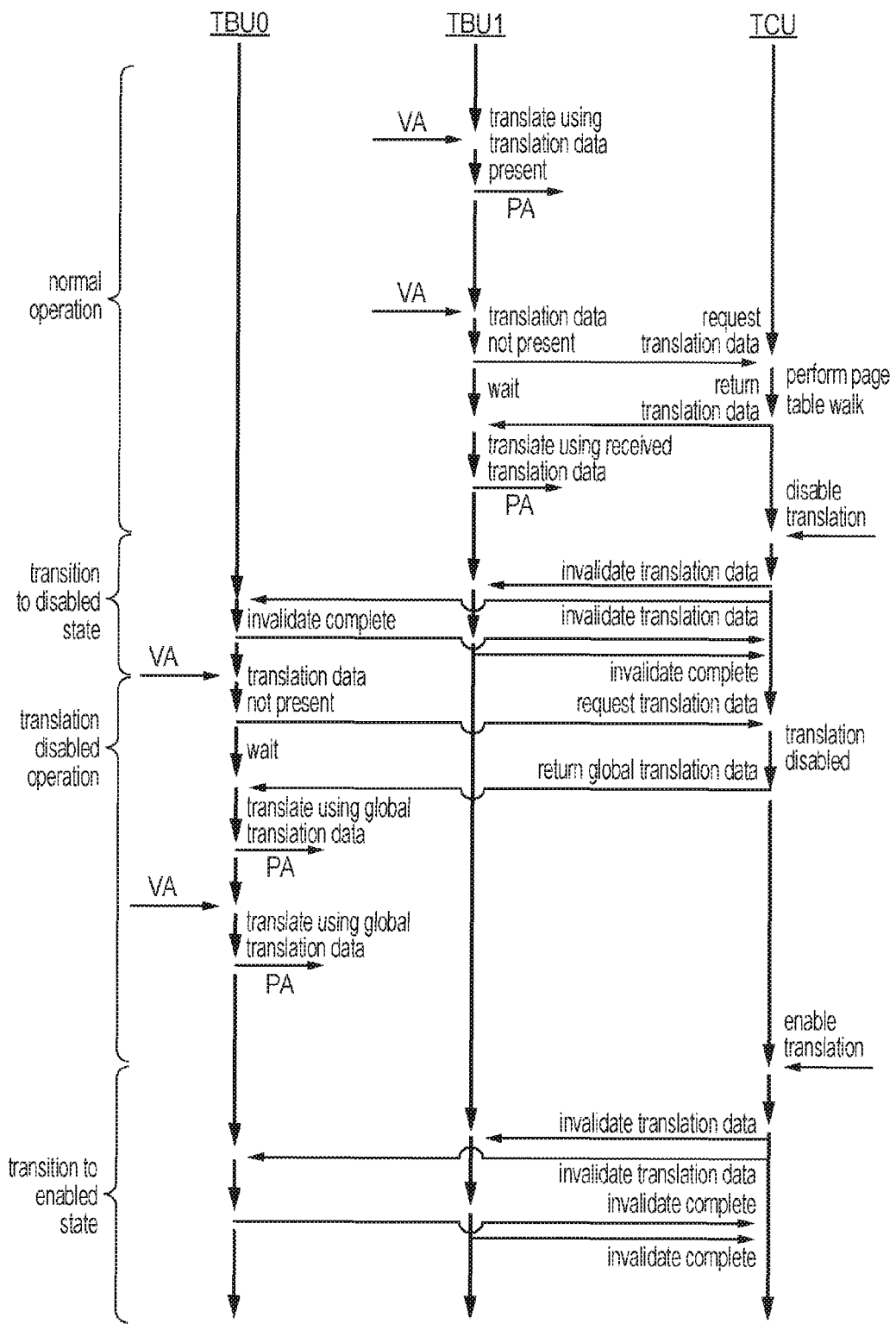
FIG. 2 schematically illustrates the operation of the system of FIG. 1 in translating virtual addresses into physical addresses.

FIG. 2 schematically illustrates example operation of a data processing systems, such as that illustrated in FIG. 1. In this example there are two translation buffer units TBU0, TBU1 and a translation control unit TCU. As illustrated, during normal operation, the translation buffer unit TBU1 receives a virtual address. The translation buffer unit TBU1 determines that it already has the associated translation data for the given type of memory access translation and the address range concerned (a translation data "hit") and accordingly generates a physical address which is then supplied to the main interconnect 16 and used to address the shared memory 12.

Subsequently, the translation unit TBU1 receives a virtual address and determines that it does not have the relevant translation data present. The translation buffer unit TBU1 then sends a request for translation data to the translation control unit TCU. The translation control unit TCU performs a page table walk through an appropriate one of the sets of page table data 20 whilst the translation buffer unit TBU1 waits. When the page table walk that completed, the translation control unit TCU returns the translation data to the translation buffer unit TBU1, which then uses this translation data to perform the relevant translation and generate a physical address PA which is output via the main interconnect 16 to the shared memory 12.

In the example illustrated in FIG. 2, following the normal operation discussed above, a transition to a disabled state is made. This transition is initiated by the translation control unit TCU receiving a disabled translation command (e.g. disable secure mode translation). This may be received via the setting of an appropriate flag within the control register 46, or by the reading of the per stream control data 22 within the memory, or in some other way. The translation control unit TCU responds to the command to disable translation by broadcasting invalidate translation data commands for the given type of memory access to both of the translation buffer units TBU0 and TBU1. Each of these in turn invalidates any translation data of the given type that it holds and returns an invalidate complete response to the translation control unit TCU whereupon the transition to the disabled state is completed. A similar action of broadcasting invalidate translation data commands may be performed when translation is enabled so as to remove any global translation data which may be present within the translation buffer units TBU0 and TBU1.

During translation disabled operation, when a translation buffer unit TBU0 receives a virtual address, then if the translation data is not present, then it sends a request for translation data to the translation control unit TCU. The translation control unit TCU detects that address translation is disabled for that type of memory access transaction and accordingly returns global translation data to the requesting translation buffer unit TBU0. This global translation data may, for example, specify memory attributes to be applied for the entire memory address space addressable by that given type of memory access transaction. When the translation buffer unit TBU0 has received the returned global translation data (and stored it within its micro TLB), it uses this global translation data to generate a physical address. Subsequently, when the translation buffer unit TBU0 receives another virtual address to translate and it is already in possession of the global translation data, this may be read directly from the associated micro translation lookaside buffer 38, 40, 42 into which that global data has been stored.

Finally in FIG. 2 a transition to the translation enabled state is made. The translation control unit receives an enable translation command (e.g. by setting a flag, reading control data or in some other way). The translation control unit TCU responds to the enable command by broadcasting invalidate translation data commands to the given type of transaction to both of the translation buffer units TBU0 and TBU1. This invalidates any global translation data held by the translation buffer units TBU0 and TBU1. The translation buffer units TBU0 and TBU1 then return an invalidation complete response to the translation control unit TCU. When either of the translation buffer units TBU0 and TBU1 subsequently receive a virtual address to translate for which they now hold no translation data, they send a request for translation data to the translation control unit TCU, as discussed above, triggering a page table walk and return of the requested translation data.

Figure 3:
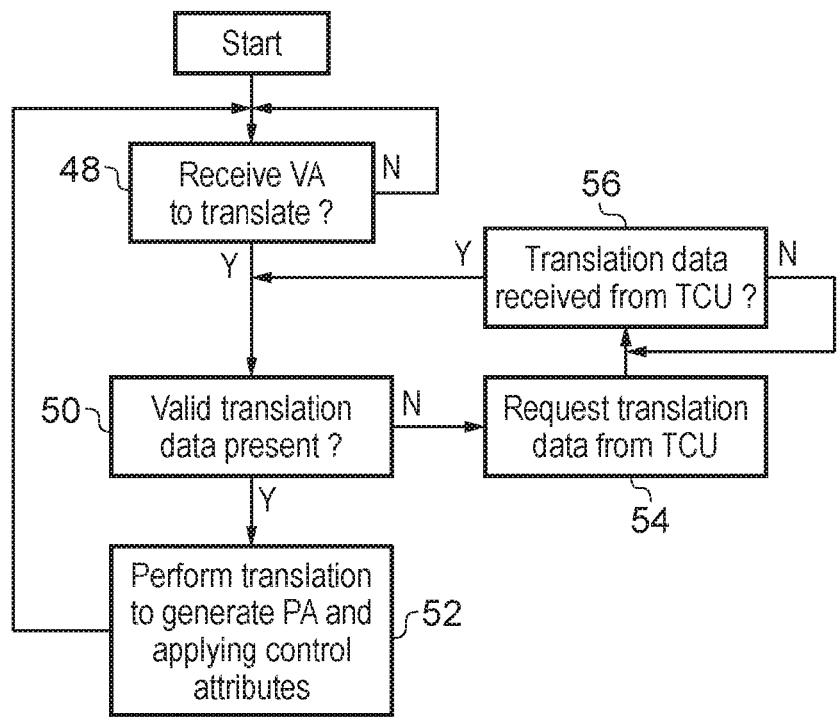
FIG. 3 is a flow diagram schematically illustrating translation request processing by a translation buffer unit.

FIG. 3 is a flow diagram schematically illustrating translation request processing by a translation buffer unit 24, 26, 28. At step 48 processing waits until a virtual address is received. Step 50 then determines whether valid translation data is present, either within the main translation lookaside buffer 32, 34, 36 or the micro translation lookaside buffer 38, 40, 42. If valid translation data is present, then step 52 performs the translation specified to generate a physical address and applies the appropriate control attributes (e.g. if the memory address translation was not permitted, then the translation would be refused and the memory access return a fault/exception). The translation performed using the valid translation data may be one which translates a virtual address to a different physical address or may be one which passes the address unaltered so as to form the physical address having checked that the control attributes are satisfied.

If the determination at step 50 is that valid translation data is not present, then step 54 serves to request translation data from the translation control unit 30. At step 56 the translation buffer unit 24, 26, 28 waits for the translated data to be received from the translation control unit 30. When the translation data is received, then processing is returned to step 50.

Figure 4:
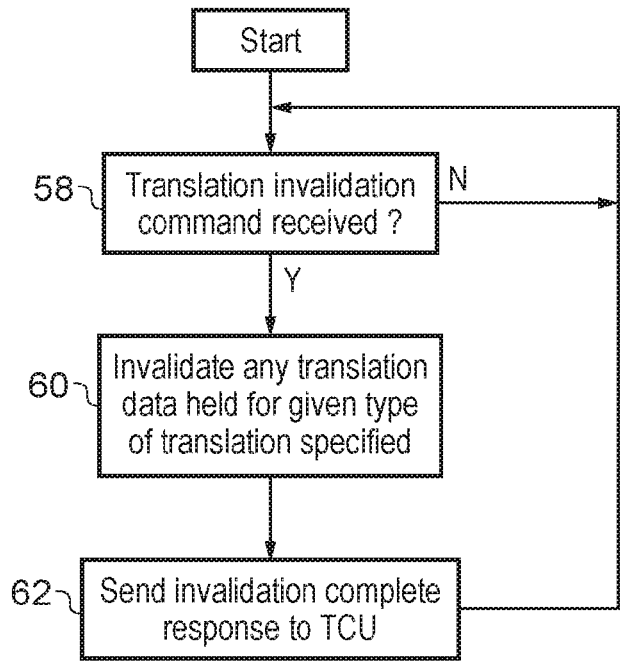
FIG. 4 is a flow diagram schematically illustrating invalidation request processing by the translation buffer unit.

FIG. 4 is a flow diagram schematically illustrating invalidation request processing by a translation buffer unit. At step 58 processing waits until a translation invalidation command is received. When a translation invalidation command has been received, then step 60 serves to invalidate any transaction data held for the given type of translation specified by the translation invalidate command. The translation invalidate command may, for example, specify that all translation data for a given security domain, for a given context, for a given stream identifier or other type of translation be invalidated. When the invalidation has been completed, then step 60 serves to send an invalidation complete response back to the translation control unit 30.

Figure 5:
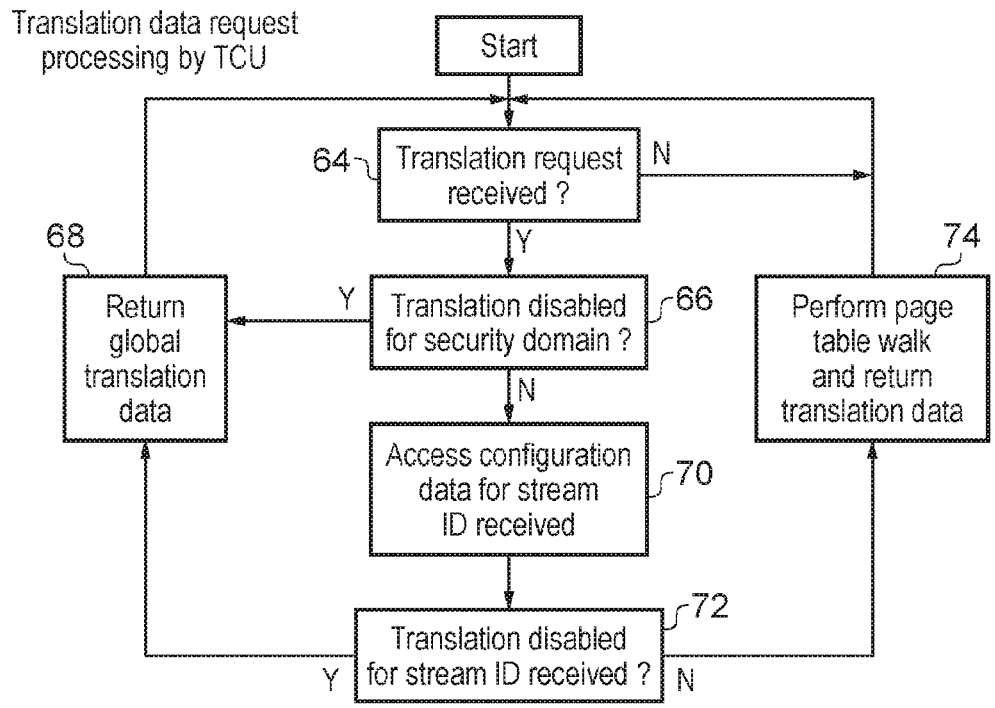
FIG. 5 is a flow diagram schematically illustrating translation data request processing by a translation control unit.

FIG. 5 is a flow diagram schematically illustrating translation data request processing by the translation control unit 30. At step 64 the translation control unit waits until a translation request is received. When a translation request has been received, step 66 determines whether a translation is disabled for that security domain. If translation is disabled for that security domain, then processing proceeds to step 68 where global translation data for the given type of translation is returned to the requesting translation buffer unit. If the determination at step 66 is not that translation is disabled for the security domain concerned, then processing proceeds to step 70 at which the per stream control data 22 stored within the memory 12 is accessed in order to read the access configuration data for that stream identifier. If this access configuration data indicates that translation is disabled for the stream identifier concerned, then this is determined at step 72 and processing again passes to step 68 where a global translation data entry is returned to the requesting translation buffer unit. If translation is not disabled for the stream identifier corresponding to the given type of memory access transaction received, then processing proceeds to step 74 at which the page table walk is performed to read the translation data from the appropriate one of the page table data sets 20 within the shared memory 12 and the translation data so read returned to the requesting translation buffer unit.

Figure 6:
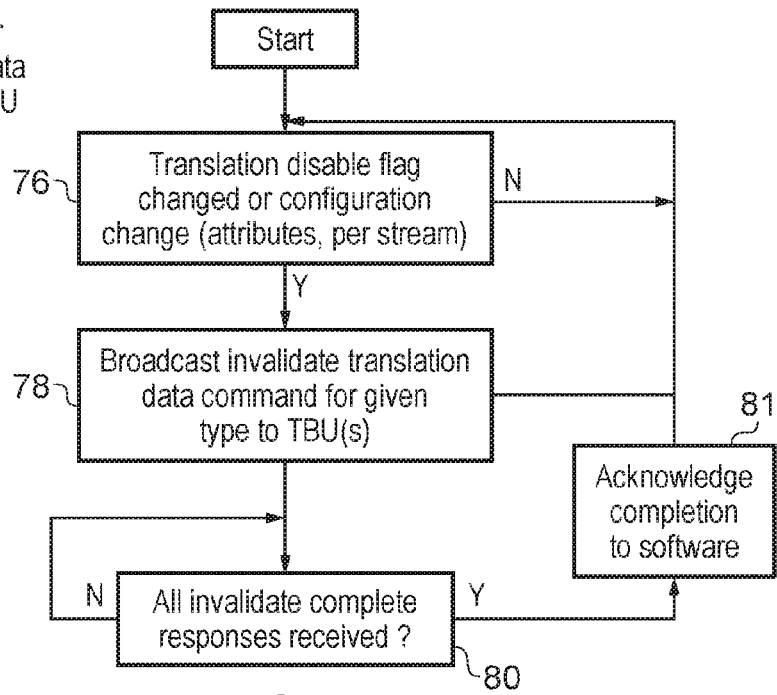
FIG. 6 is a flow diagram schematically illustrating a response by the translation control unit to a translation disable flag or configuration data changing.

FIG. 6 is a flow diagram schematically illustrating processing in the translation control unit arising in response to a change in a disable flag or configuration data for a stream identifier. At step 76 processing waits until a change is detected in a disable flag or configuration data controlling whether or not translation is performed for a given type of memory access transaction. When such a change has been identified, then step 78 serves to broadcast an invalidate translation data command for the given type of memory access transaction concerned to all of the attached translation buffer units 24, 26, 28 which may be holding translation data of that given type. The translation control unit 30 then waits at step 80 until all invalidate complete responses have been received from the translation buffer units 24, 26, 28 to which the invalidate transaction data command was sent, before acknowledging completion of the change to software in step 81.

Figure 7:
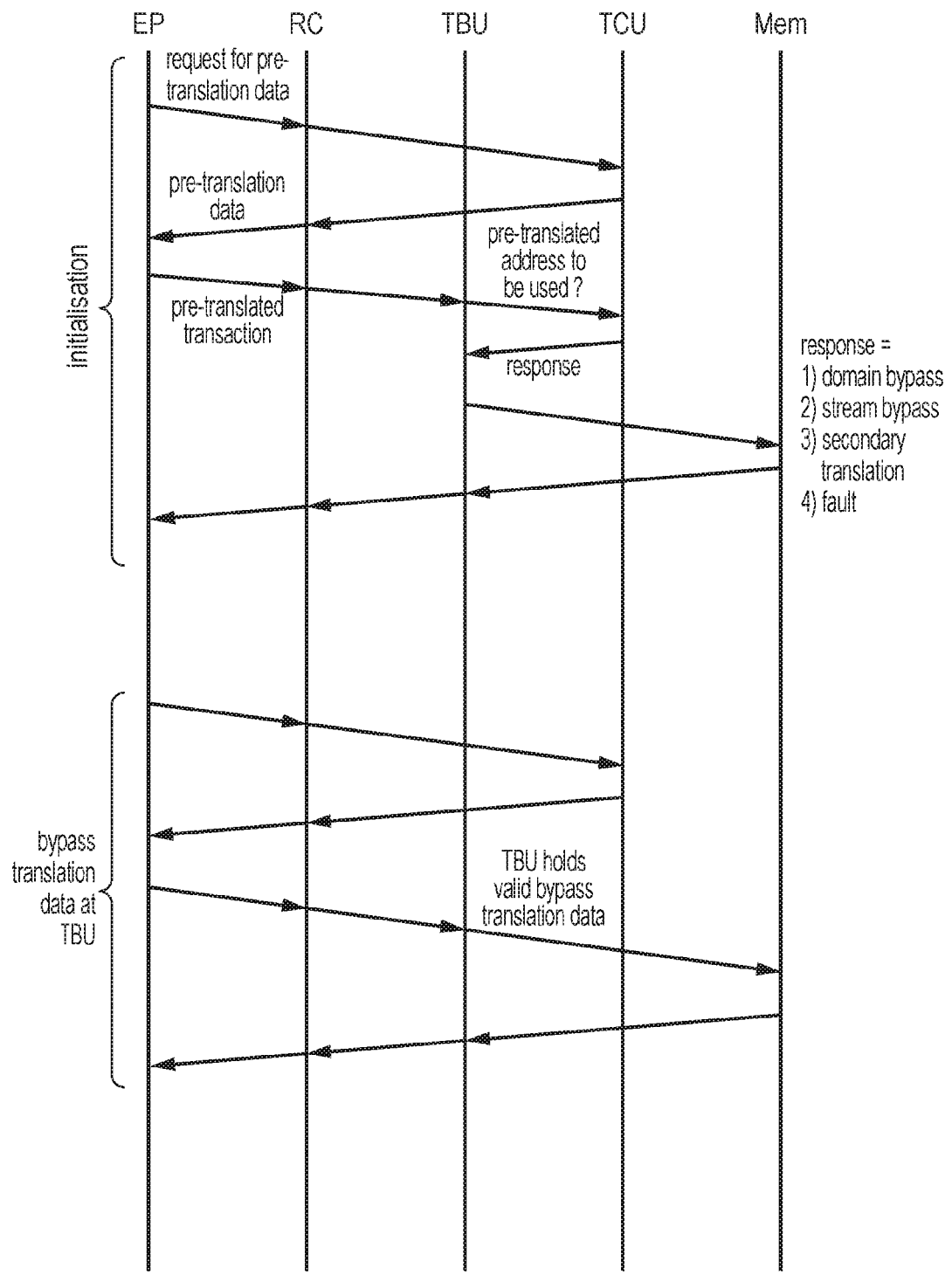
FIG. 7 schematically illustrates operation of an embodiment supporting the use of pre-translation of addresses prior to these reaching a translation buffer unit.

As illustrated in FIG. 1, a PCIexpress root complex 10 may be attached via a translation buffer unit 28 to the main interconnect 16. Multiple end points 82, 84 are attached to the PCIexpress root complex 10. Some of these end points 82, 84 may include address translation service units 86 which can request address translation from the translation control unit 30 and use this locally to form pre-translated memory access transactions which are then passed via the PCIexpress root complex 10 to the translation buffer unit 28. The translation buffer unit 28 may be controlled to handle pre-translated memory access transactions from the end point 84 in a variety of different ways by the translation control unit 30. As illustrated in FIG. 7, an end point 84 may use its address translation service unit 86 to generate a request for pre-translation data that it may use from the translation control unit 30. This request for pre-translation data is routed via the PCIexpress root complex 10 to the translation control unit 30 which responds via the PCIexpress root complex 10 to return the pre-translation data to the address translation service unit 86 of the end point 84. Subsequently, the end point 84 can issue a pre-translated transaction via the PCIexpress root complex 10 to the translation buffer unit 28. The translation buffer unit 28 then sends a query to the translation control unit 30 to determine whether or not the pre-translated transaction is valid to issue to the shared memory 12. The translation control unit 30 responds, in this example embodiment, by returning one of four possible responses: domain bypass, stream bypass, secondary translation or fault. A domain bypass indicates the present and all subsequent pre-translated transactions for that domain should be allowed to be issued directly from the translation buffer unit 28 to the shared memory 12. The stream bypass response indicates the same, but in respect of a given stream identifier rather than in respect of an entire domain. A secondary translation response indicates that the pre-translated transaction should be subject to a secondary translation by the translation buffer unit 28 using secondary translation data supplied in the secondary translation response. The fault response indicates that a fault condition has arisen with the configuration of the address translation service unit 86.

When the translation buffer unit 28 has received the response from the translation control unit 30, it then passes the pre-translated data (optionally subject to the secondary translation and assuming that no fault has occurred) onto the shared memory 12 which returns the data, or a response indicating that a write has been made, back to the end point 84.

The lower portion of FIG. 7 indicates the behavior when the translation buffer unit 28 is already holding global translation data indicating that either an appropriate domain bypass or stream identifier bypass has been granted. A request for pre-translation data is passed from the end point 84 to the end point translation control unit 30 in the same manner as previously. Subsequently, when a pre-translated transaction is issued, the translation buffer unit 28 already holds valid bypass translation data and accordingly need not request from the translation control unit 30 whether the pre-translated transaction is appropriate to issue to the shared memory 12. Accordingly, the translation buffer unit 28 forwards the pre-translated transaction directly to the shared memory 12 which then returns the data (or the confirmation of the write) via the translation buffer unit 28 to the end point 84.

Although illustrative embodiments have been described in detail herein with reference to the accompanying drawings, it is to be understood that the claims are not limited to those precise embodiments, and that various changes, additions and modifications can be effected therein by one skilled in the art without departing from the scope and spirit of the appended claims. For example, various combinations of the features of the dependent claims could be made with the features of the independent claims.

We claim:

1. Apparatus for processing data comprising:
   translation buffer circuitry to store translation data to translate an input address of a memory access transaction to an output address; and
   translation control circuitry to provide said translation data to said translation buffer circuitry, wherein
   said translation buffer circuitry is responsive to receipt of a memory access transaction for which translation data is unavailable in said translation buffer circuitry to issue a request to said translation control circuitry to provide translation data for said memory access transaction;

said translation control circuitry is responsive to a change in enablement of address translation for a given type of memory access transaction to issue an invalidate command to said translation buffer circuitry to invalidate any translation data for said given type of memory access transaction stored in said translation buffer circuitry; and said translation control circuitry is responsive to receipt of a request for translation data from said translation buffer circuitry for a memory access of said given type for which memory address translation is disabled to return global translation data to be used by said translation buffer circuitry for all memory access transactions of said given type.

2. Apparatus as claimed in claim 1, wherein said global translation data specifies that said input address is used unaltered as said output address.

3. Apparatus as claimed in claim 1, wherein said global translation data specifies access control attributes applied to said memory access transaction.

4. Apparatus as claimed in claim 1, wherein said memory access transaction has an associated stream identifier to identify a stream of transactions including said memory access transaction, said transaction control circuitry is responsive to a change of enablement of translation for a given stream identifier to invalidate any translation data stored in said translation buffer circuitry for said given stream identifier, and said global translation data is used by said translation buffer circuitry for all memory access translation associated with said given stream identifier for which translation is disabled.

5. Apparatus as claimed in claim 1, wherein said memory access transaction has an associated security status, said transaction control circuitry is responsive to a change of enablement of translation for a given security status to invalidate any translation data stored in said translation buffer circuitry for said given security status, and said global translation data is used by said translation buffer circuitry for all memory access translation associated with said given security status for which translation is disabled.

6. Apparatus as claimed in claim 1, wherein said memory access transaction has an associated attribute indicating said memory access transaction is a pre-translated memory access transaction that has already been subject to an address translation, said transaction control circuitry is responsive to a change of enablement of translation for said pre-translated memory access translations to invalidate any translation data stored in said translation buffer circuitry for said pre-translated memory access transactions, and said global translation data is used by said translation buffer circuitry for all pre-translated memory access translation for which translation is disabled.

7. Apparatus as claimed in claim 6, wherein said memory access transaction is pre-translated using source translation data held by a source of said memory access transaction.

8. Apparatus as claimed in claim 1, wherein said translation buffer circuitry includes a main translation lookaside buffer to store a plurality of translation data entries and a micro translation lookaside buffer to store fewer translation data entries than said main translation lookaside buffer and having a lower energy consumption to access than said main translation lookaside buffer, wherein said global translation data is stored in said micro translation lookaside buffer.

9. Apparatus as claimed in claim 1, comprising a plurality of translation buffer circuits controlled by said translation control circuitry.

10. Apparatus as claimed in claim 1, wherein said global translation data has an associated page size corresponding to a full range of said input address indicating said global translation data is used for all input addresses.

11. Apparatus as claimed in claim 1, wherein said translation control circuitry includes one or more control registers to store disable flags to control disabling of address translations for respective given types of memory access transaction.

12. Apparatus as claimed in claim 11, wherein said disable flag are set under software control.

13. Apparatus as claimed in claim 1, wherein said translation control circuitry is reads disable controlling data from memory to control disabling of address translations for respective given types of memory access transaction.

14. Apparatus as claimed in claim 1, comprising a main interconnect and wherein said memory access transaction including said output address is communicated via said main interconnect.

15. Apparatus as claimed in claim 1, comprising a private translation control interconnect and wherein said translation buffer circuitry and said translation control circuitry communicate via said private translation control interconnect.

16. Apparatus for processing data comprising:
translation buffer means for storing translation data to translate an input address of a memory access transaction to an output address; and
translation control means for providing said translation data to said translation buffer means, wherein
said translation buffer means is responsive to receipt of a memory access transaction for which translation data is unavailable in said translation buffer means to issue a request to said translation control means to provide translation data for said memory access transaction;
said translation control means is responsive to a change in enablement of address translation for a given type of memory access transaction to issue an invalidate command to said translation buffer means to invalidate any translation data for said given type of memory access transaction stored in said translation buffer means; and
said translation control means is responsive to receipt of a request for translation data from said translation buffer means for a memory access of said given type for which memory address translation is disabled to return global translation data to be used by said translation buffer means for all memory access transactions of said given type.

17. A method of processing data comprising:
storing in translation buffer circuitry translation data to translate an input address of a memory access transaction to an output address; and
providing said translation data to said translation buffer circuitry with translation control circuitry, wherein
in response to receipt of a memory access transaction for which translation data is unavailable in said translation buffer circuitry, said translation buffer circuitry issue a request to said translation control circuitry to provide translation data for said memory access transaction;
in response to a change in enablement of address translation for a given type of memory access transaction, said translation control circuitry issues an invalidate command to said translation buffer circuitry to invalidate any translation data for said given type of memory access transaction stored in said translation buffer circuitry; and in response to receipt of a request for translation data from said translation buffer circuitry for a memory access of said given type for which memory address translation is disabled, said translation control circuitry returns global translation data to be used by said translation buffer circuitry for all memory access transactions of said given type.

* * * * *